United States Patent

[11] 3,614,131

| [72] | Inventor | Jack L. Lopez<br>P.O. Box 1061, San Carlos, Calif. 94070 |
|---|---|---|
| [21] | Appl. No. | 6,183 |
| [22] | Filed | Jan. 27, 1970 |
| [45] | Patented | Oct. 19, 1971 |

[54] AIRFOIL FOR TWO-WHEELED VEHICLE
8 Claims, 3 Drawing Figs.

[52] U.S. Cl. .................................................. 280/289
[51] Int. Cl. .................................................. B62j 39/00
[50] Field of Search .................................. 280/289,
200, 210, 213, 1.21, 1.11; 180/1.15; 296/1, 78.1,
91; D90/8, 1; 244/50

[56] References Cited
UNITED STATES PATENTS

| 3,545,700 | 12/1970 | Davis et al. | 280/289 |
| 2,126,589 | 8/1938 | Turner | 180/1.15 UX |
| 2,264,030 | 11/1941 | Tomasini | 280/1.21 X |
| 3,380,756 | 4/1968 | Poynter | 280/289 |
| 3,416,837 | 12/1968 | Saunders | 280/289 UX |
| 3,455,594 | 7/1969 | Hall et al. | 296/1 |

FOREIGN PATENTS

| 429,571 | 9/1911 | France | 180/1.15 |
| 347,445 | 6/1920 | Germany | 280/213 |
| 11,592 | 12/1924 | Netherlands | 180/30 |
| 505,524 | 5/1939 | Great Britain | 296/1 |
| 691,520 | 5/1940 | Germany | 180/1 |

*Primary Examiner*—Kenneth H. Betts
*Attorney*—Townsend and Townsend

ABSTRACT: A stabilizing device for a two-wheeled vehicle wherein the device includes an airfoil and means for mounting the airfoil on the vehicle at a location to cause an air force to be developed during movement of the vehicle with the air force serving to produce a moment about the axis of rotation of one of the wheels of the vehicle, tending to rotate the latter in a predetermined direction.

PATENTED OCT 19 1971    3,614,131
FIG.1
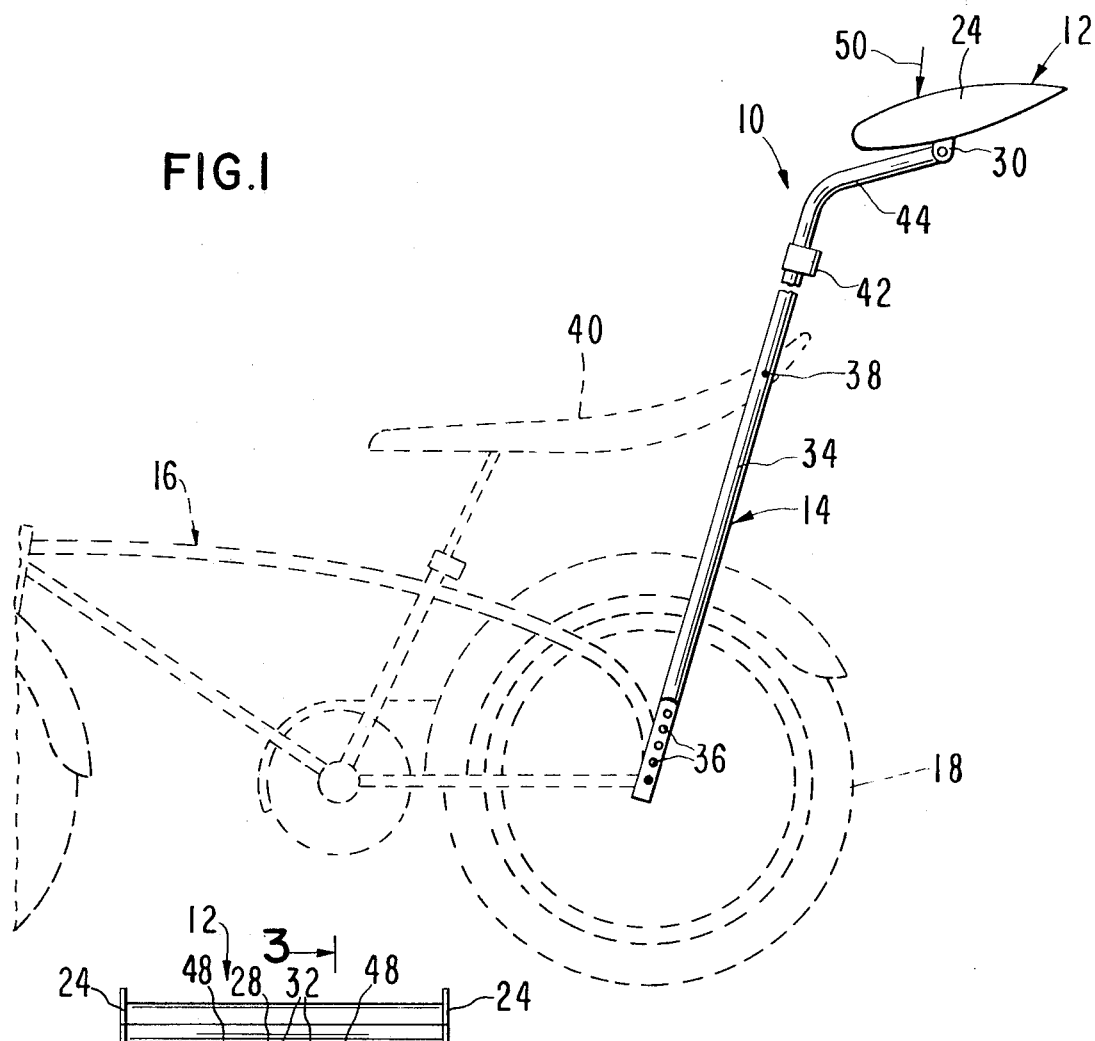
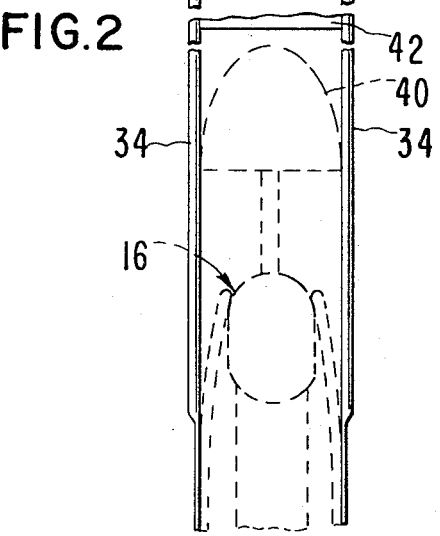
FIG.2
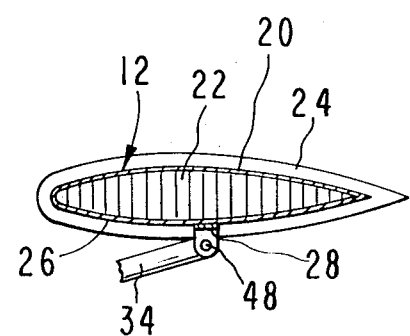
FIG.3
INVENTOR.
JACK L. LOPEZ
BY
Townsend and Townsend
ATTORNEYS

AIRFOIL FOR TWO-WHEELED VEHICLE

This invention relates to improvements in two-wheeled vehicles and, more particularly, to a stabilizing device for such a vehicle.

The invention is directed to airfoil structure for a two-wheeled vehicle wherein the structure includes an airfoil having means for mounting the same at a location with respect to one of the wheels of a two-wheeled vehicle such that the air force exerted on the airfoil during movement of the vehicle will have a stabilizing effect therefor to improve its riding characteristics while permitting certain stunts or maneuvers to be more easily performed.

The mounting means for the airfoil is configured to position the vehicle adjacent to one wheel thereof and out of vertical alignment with the axis of rotation of the wheel. Thus, the air force exerted on the airfoil will have a line of action which is spaced from the wheel axis so as to produce a moment about the wheel axis, tending to rotate the vehicle in a predetermined direction. This moment serves to stabilize the ride of the vehicle in that it increases the lateral stability of the vehicle and minimizes the tendency of the vehicle to weave as it moves forwardly. Also, if the moment tends to rotate the vehicle in the proper direction, this feature can be used to permit stunts or maneuvers to be more readily performed with the vehicle since less effort till be required to handle the vehicle during such stunts or maneuvers.

To illustrate the last-mentioned feature, when the airfoil is associated with the rear wheel of a two-wheeled vehicle, the airfoil is mounted above and to the rear of the axis of rotation of the rear wheel. Thus, the air force exerted on the airfoil will be downward and will have a line of action disposed vertically and to the rear of the rear wheel axis so that the moment developed by the air force will produce a lifting effect for the front of the vehicle. Thus, stunts and maneuvers can more easily be accomplished during forward movement of the vehicle since less effort will be required to jerk up the front of the vehicle. Moreover, the airfoil renders the vehicle more stable during such stunting and maneuvering and, as such, provides a safety feature therefor.

The airfoil can be of any suitable construction and can be mounted on the vehicle by any suitable mounting structure. The mounting means preferably includes a pair of support rods, each of which is secured at one of its ends to a wheel axle. The rods extend away from the axle and have transversely extending end portions to the outer ends of which the airfoil is connected. In this way, the airfoil is spaced from the vertical plane passing through the wheel axis.

The primary object of this invention is to provide airfoil structure for a two-wheeled vehicle wherein the structure is adapted to be mounted adjacent to one wheel of the vehicle at a location to stabilize the vehicle during forward movement thereof and to permit stunts and maneuvers to be performed more readily while maintaining the stability of the vehicle.

Another object of this invention is to provide a two-wheeled vehicle having an airfoil mounted above and to the rear of the axis of rotation of the rear wheel of the vehicle so that an air force exerted on the airfoil will have a line of action spaced rearwardly from the wheel axis to thereby provide a moment about the wheel axis in a direction to provide stability for the vehicle while permitting a lifting effect on the front portion of the vehicle.

A further object of this invention is to provide an airfoil of the aforesaid character wherein the airfoil is connected to proximal ends of a pair of support rods at a location out of vertical alignment with the axis of rotation of one of the wheels so that the airfoil will be in a position to cause a moment to be developed in one direction about the axis of the adjacent wheel.

Other objects of this invention will become apparent as the following specification progresses, reference being had to the accompanying drawing for an illustration of an embodiment of the invention. In the drawing FIG. 1 is a side elevational view of the airfoil structure and the means for mounting the same on a two-wheeled vehicle, the latter being shown in dashed lines;

FIG. 2 is a rear elevational view of the structure of FIG. 1; and

FIG. 3 is an enlarged cross-sectional view taken along line 3—3 of FIG. 2.

The airfoil structure of this invention is broadly denoted by the numeral 10 and includes an airfoil 12 having means 14 for mounting the airfoil on a two-wheeled vehicle 16 adjacent on one of the wheels thereof. As shown in FIG. 1, the vehicle is a bicycle of conventional construction and airfoil structure 10 is shown as being connected to the rear wheel 18 of the bicycle.

Airfoil 12 can be of any suitable construction but, for purposes of illustration, it includes a relatively thin wall 20 surrounding a space which is filled with a suitable filler 22, such as honeycomb material or the like. The filler strengthens the airfoil and serves to maintain its shape.

The airfoil has a pair of plates 24 secured thereto at the ends thereof to smooth out the airflow passing over and under the airfoil during forward movement of the vehicle. Each end plate 24 has the shape of an airfoil 12 but is larger than the latter, as shown in FIGS. 2 and 3 so as to present surface portions which guide the air flow rearwardly of the airfoil while preventing lateral flow of the air off the ends of the airfoil.

The airfoil has a bottom surface 26 to which is secured an inverted U-shaped bracket 28 having sides 30 as shown in FIG. 2. The bracket can be secured in any suitable manner to the airfoil but, for purposes of illustration, a pair of screws 32 are used for this purpose.

Mounting means 14 includes a pair of support rods 34 which are preferably tubular and which extend upwardly from the axis of wheel 18 on opposite sides of the wheel as shown in FIG. 2. Each rod 34 has a number of holes 36 at its lower end whereby the axle of the wheel can extend through one of the holes for mounting the rod on the bicycle. Each rod further has a hole for receiving a pin or bolt 38 for attaching the rod to the rear portion of a seat 40 of the bicycle to thereby support the seat against downward movement. Also, the rods are supported by the seat. Other means of bracing or supporting the rod can be used, if desired. A cross brace 42 interconnects rods 34 and maintains the spacing therebetween.

Each rod 34 has an upper end portion 44 which extends upwardly and rearwardly from the main portion of the rod, as shown in FIG. 1. The rear extremity of each end portion 44 if coupled by a pin 48 to the corresponding side 30 of bracket 28. Pin 48 may comprise a threaded shaft having a nut thereon which can be tightened to permit variations in the operative position of airfoil 12. When the desired position is reached, the nut can be tightened to rigidly connect the bracket to the corresponding end portion 44. The angle of attack of the airfoil will normally be negative so that a downward air force is exerted on the airfoil during forward movement of the bicycle.

In use, airfoil 12 is mounted on upper end portions 44 by support rods 34 coupled to the bicycle so that the airfoil will be mounted above and to the rear of the axis of rotation of wheel 18. During forward movement of the bicycle, air will flow about the airfoil above and below the same and cause a downward force due to the negative angle of attack of the airfoil, the downward force being represented by arrow 50 (FIG. 1) passing through the center of pressure of the airfoil. Thus, arrow 50 represents the line of action of the air force developed due to the forward movement of the bicycle and this line of action is spaced rearwardly from the axis of wheel 18. Thus, a clockwise moment will be developed about the axis of wheel 18 so as to tend to cause rotation of the frame of the bicycle about the axis of wheel 18. Such moment, therefore, has a lifting effect on the front portion of the bicycle so that stunts and maneuvers can be easily performed with a minimum of effort. Such a stunt may take the form of jerking up the front portion of the bicycle to lift the front wheel off the ground and to keep it elevated while still peddling the bicycle to keep it moving forwardly. Since the moment tends to rotate the bicycle frame clockwise, less effort is required to perform this particular stunt.

Airfoil 12 contributes to the lateral stability of the bicycle during forward movement of the same. The airfoil minimizes any tendency for the bicycle to weave during forward movement and is effective in turns as well as in straight-line movement. The lateral stability provided by the airfoil is maintained during stunting and maneuvering so that the airfoil provides a safety feature for the bicycle.

The airfoil of this invention is suitable for use with other two-wheeled vehicles, such as, motorcycles, motor scooters and motor bikes. It can be readily attached to a two-wheeled vehicle without any substantial modification thereto. Also, by adjusting the angle of attack of the airfoil, the air force developed on the airfoil can be changed.

I claim:

1. Structure for stabilizing a two-wheeled vehicle having a seat comprising: an airfoil; and rod means coupled with said airfoil for mounting the same on a two-wheeled vehicle in spaced relationship above the seat and rearwardly of the axis of rotation of one of the wheels, said rod means having a portion for direct attachment to said seat when the airfoil is mounted thereabove.

2. Structure as set forth in claim 1, wherein said airfoil has a pair of opposed ends, an upper surface, and a lower surface, and including a plate for each end respectively, each plate extending above and below said upper and lower surfaces, respectively.

3. In a two-wheel vehicle having a rear wheel and a seat above the rear wheel, the combination with said rear wheel and said seat of: an airfoil; a pair of spaced rods secured to and extending upwardly from the axis of said rear wheel on opposed sides of the latter; means coupling the rods intermediate their ends to said seat; and means on the upper ends of the rods for securing the airfoil thereto.

4. In a vehicle as set forth in claim 3, wherein each rod has a rearwardly extending, upper end portion, said airfoil being coupled to the rear extremities of the upper end portions of said rods.

5. Structure for stabilizing a two-wheel vehicle comprising: an airfoil; a pair of spaced rods adapted to be secured to one of the wheels of the vehicle and to extend upwardly from the axis; and a bracket secured to said airfoil and being pivotally secured to the upper ends of the rods, whereby the airfoil can be mounted on said vehicle in spaced relationship to said axis of rotation.

6. In a two-wheel vehicle having a rear wheel, the combination with said rearwheel of: an airfoil having a lower surface; an inverted U-shaped bracket secured to said lower surface; a pair of rods disposed on respective sides of and extending upwardly from said rear wheel, each rod having a rearwardly extending, upper end portion, said bracket being pivotally secured to the rear extremities of said upper end portions.

7. A device for stabilizing a two-wheel vehicle having a seat comprising: an airfoil; and a support independent of the structure of the vehicle and adapted to be secured to and to extend upwardly from the axis of the rear wheel of the vehicle, said support having an upper end portion spaced above the seat and extending rearwardly with respect thereto, said airfoil being secured to the rear extremity of said upper end portion.

8. A device as set forth in claim 7, wherein said airfoil is pivotally secured to said rear extremity.